UNITED STATES PATENT OFFICE.

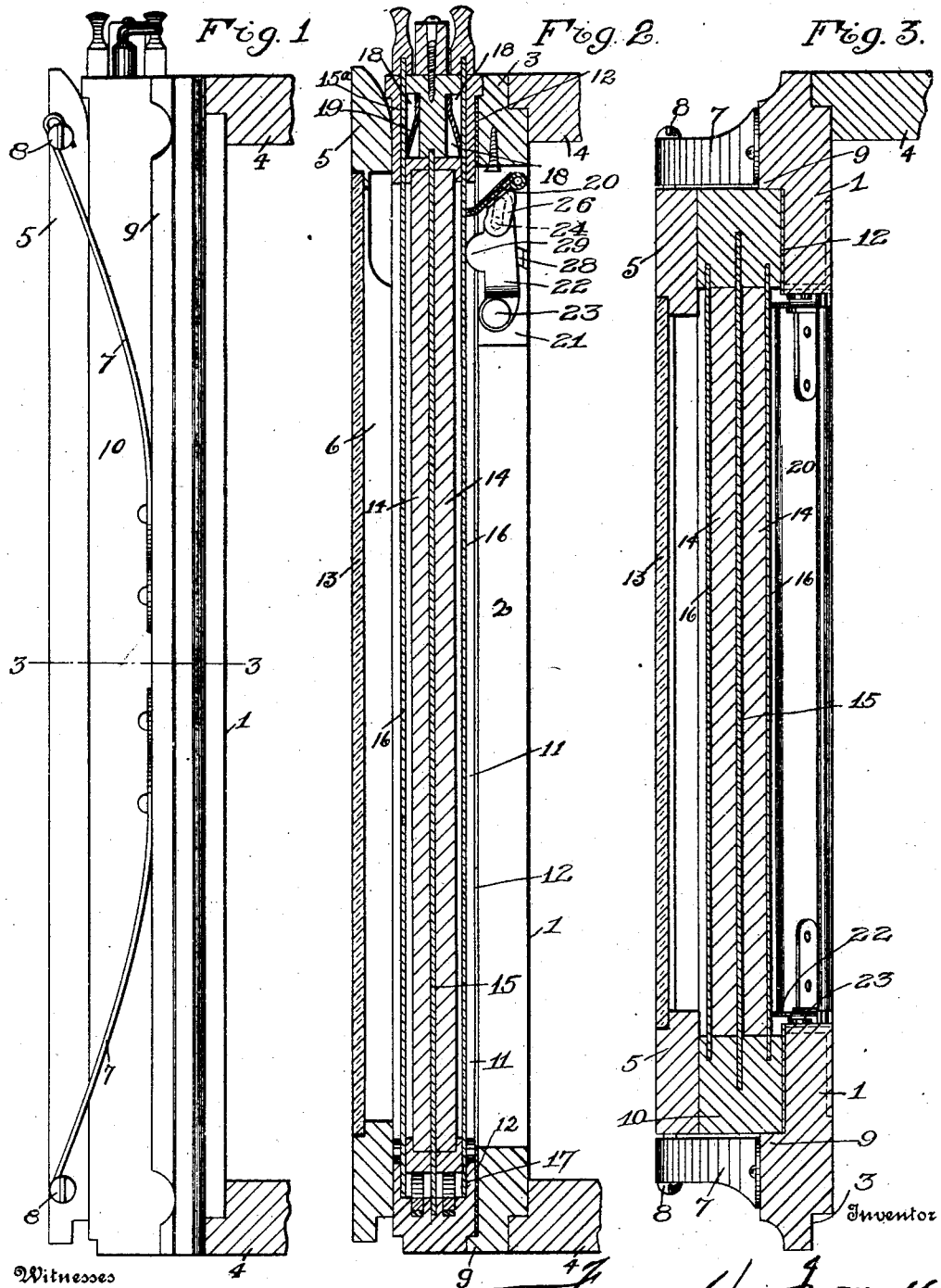

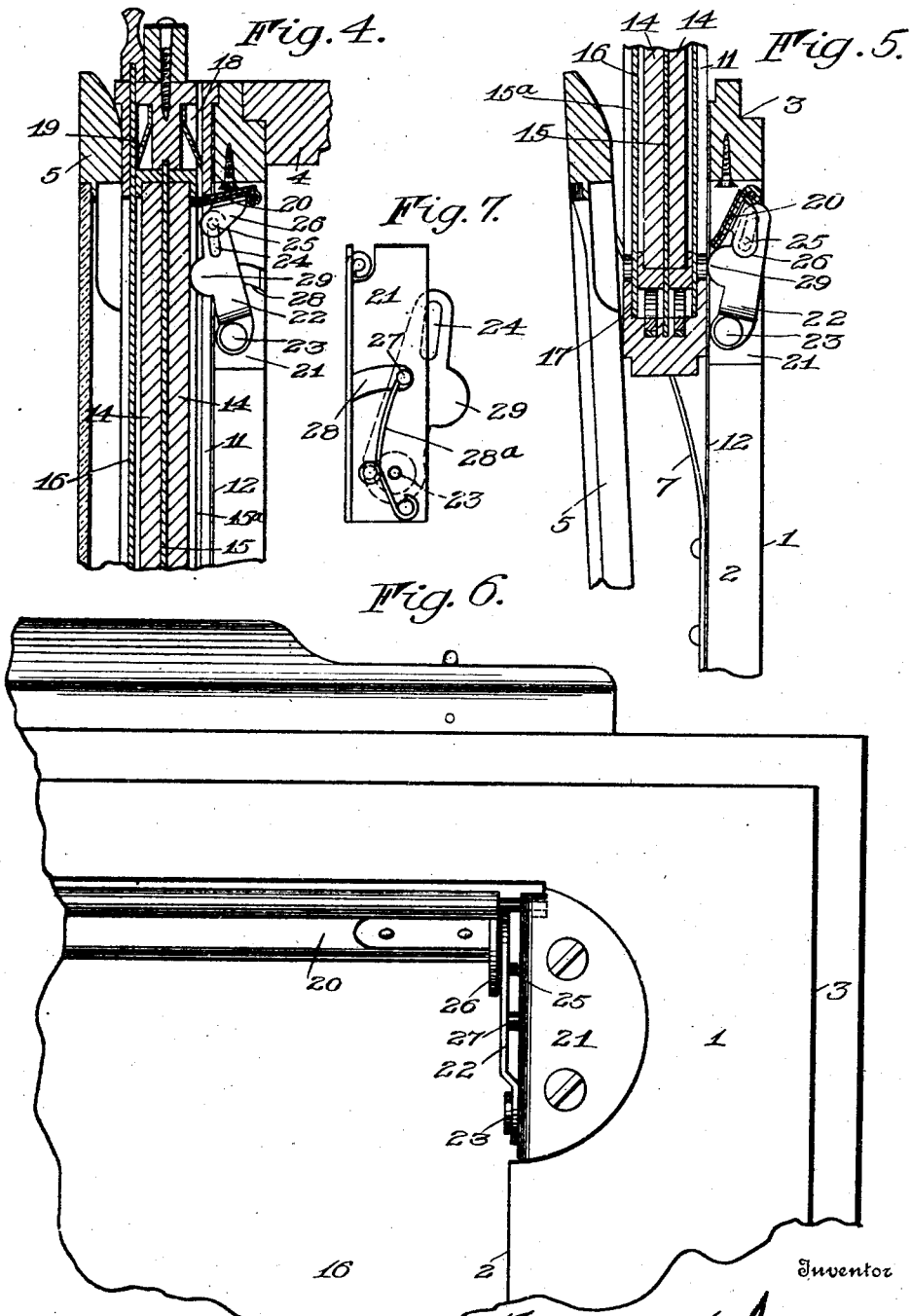

TRUMAN W. INGERSOLL, OF ST. PAUL, MINNESOTA, ASSIGNOR TO EASTMAN KODAK CO., OF ROCHESTER, NEW YORK, A CORPORATION OF NEW YORK.

CAMERA-BACK.

No. 929,671.　　　Specification of Letters Patent.　　　Patented Aug. 3, 1909.

Application filed April 9, 1908. Serial No. 425,994.

*To all whom it may concern:*

Be it known that I, TRUMAN W. INGERSOLL, of St. Paul, in the county of Ramsey and State of Minnesota, have invented certain new and useful Improvements in Camera-Backs; and I do hereby declare the following to be a full, clear, and exact description of the same, reference being had to the accompanying drawings, forming a part of this specification, and to the reference-numerals marked thereon.

My present invention relates to photography and more particularly to cameras and it has for its object to provide a camera back of the type adapted for the support of a plate holder and which will be so equipped as to at all times effectively prevent the entrance of light at the rear of the camera and fully protect from extraneous rays the plates carried by the plate holder during all the movements of their exposing shutters or slides.

To these and other ends the invention consists in certain improvements and combinations of parts all as will be hereinafter more fully described, the novel features being pointed out in the claims at the end of the specification.

In the drawings:—Figure 1 is a side elevation of a camera back constructed in accordance with and illustrating one embodiment of my invention, a plate holder being shown supported thereby. Fig. 2 is a central vertical section thereof. Fig. 3 is a transverse section substantially on the line 3—3 of Fig. 1. Fig. 4 is a fragmentary section corresponding to that of Fig. 2 showing the position of the light excluding member after the shutter of the plate holder has been withdrawn. Fig. 5 is a view similar to Fig. 4 but showing the action of the light excluding member when the plate holder is withdrawn from its support. Fig. 6 is a fragmentary view of the camera back showing the controlling mechanism for the light excluding member in front elevation. Fig. 7 is a detail of the controlling mechanism for the light excluding member.

Similar reference numerals in the several figures indicate similar parts.

Referring more particularly to the drawings 1 indicates a frame or back board which may be removable and reversible having an exposure opening 2 therein and suitably rabbeted as at 3 or otherwise fitted to coöperate with the rear of the camera 4. Arranged in opposition with and movable relatively thereto is a frame 5 having an opening 6 therein substantially coincident with the opening 2 and normally held in yielding contact with the frame 1 by resilient connecting arms 7, secured to one of the members and movably engaging the other as at 8. Ribs or flanges 9 on the bottom and sides of the frame 1 extend upon corresponding sides of the frame 5 when the two are in contact or slightly separated to guide and define the position of the latter, to exclude light and in the present arrangement support the plate holder frame 10 which is accommodated within a chamber formed between and by the separation of the frames 1 and 5 and held by the resilient pressure of the arms 7. The plate holder is inserted through an opening at the top of the back formed by the partial separation of the upper edges of the frames and when pressed downwardly the movable frame yields outwardly to accommodate it, its inward movement being arrested by engagement with the lower of the flanges 9 at which point an opening 11 in the said plate holder frame is brought in alinement with the corresponding opening in the frame 1.

To provide a substantial contact with both the movable frame 5 and the plate holder frame 10 whereby light seeking entrance at such points will be excluded from the interior of the camera, I prefer to provide the outer coöperating face of the back board 1 with a covering of villous or other suitable material indicated by 12. The frame 5 may be and usually is provided with a panel 13 of ground glass or other proper substance to constitute a focusing screen to be utilized in properly positioning the image before the plate holder is inserted but when the back is fitted to cameras intended for the use of films as well as thus adapted for the use of plates the said panel may be of opaque material instead of an opaque flap or covering provided for the ground glass.

The plate holder which I have illustrated in use in the present embodiment is of the reversible type adapted for the reception and exposure of two plates and comprises the frame 10 before mentioned provided with two compartments for the reception of the sensitized plates 14, formed by a partition 15 therein. At either side of the said partition are arranged slots or openings 15ᵃ in one end of the frame through which are adapted to pass the sliding and in the present instance, detachably removable opaque shutters 16 engaging at their lower or inner edges within grooves 17 in the lower rail of the frame 10 to protect the plates within the chambers. The upper portion of the frame is provided with recesses 18 communicating with the openings 15 and containing the usual light seals comprising preferably spring operated flaps 19 engaging the shutters 16 when in the openings, (Fig. 2), and operating to close the latter against the entrance of light when the shutters are withdrawn (Fig. 4).

Pivoted preferably at the upper end of and within the opening 2 in the back frame 1 is a movable light excluding member or flap 20 which preferably extends throughout the width of the opening in the back frame, and into the plate holder. This flap is in the present instance journaled in case plates 21 on the frame 1 and at opposite sides thereof and controlled in its movements by levers 22 pivoted at 23 within the opening 2 and having slots at their movable ends (Figs. 4 and 7) within which engage pins 25 on the ears 26 with which the flap 20 is in the present instance provided. The controlling levers themselves are provided with pins or projections 27 projecting through slots 28 in the case plates 21 and engaged by tension members or spring 28ᵃ on the inner sides thereof which operate through the medium of the controlling lever 22 to move the light excluding flap 20 beyond the contacting or coöperating face of the frame and toward and within the plate holder. The flap 20 may be made of a stiff material and provided with a soft fabric to insure an even and perfect contact as hereinafter described.

Before the plate holder is inserted and the frames 1 and 5 of the back are in contact the flap 20 is moved by its springs rearwardly beyond the rear surface of the frame 1 to seal and close the joint between the frames at the point of insertion of the holder. Upon the introduction of the plate holder by slightly separating the frames, the advancing edge thereof displaces the flap which yields inwardly as shown in Fig. 5 and then, subsequently moves outwardly to project within the plate holder frame and into engagement with the shutter 16 thereof. When the shutter is being withdrawn to effect the exposure of the plate the flap engages it throughout its length while after the said shutter is entirely removed from the holder the flap operates to instantly close the opening 15ᵃ in the latter.

When a single light excluding flap such as the flaps 19 is employed and the shutter is again inserted after the exposure, it is natural and convenient for the operator to first insert a corner thereof as a means for guiding it as a whole within the narrow opening and it not infrequently occurs that the flap 19 is displaced by this advance corner before the body of the shutter has filled the opening. By the present construction, this risk of allowing the entrance of light at this point is obviated as the flap 20 on the camera back is still in a position to close the opening and the two are displaced successively so that one or the other is at all times performing its functions.

In order to prevent the flap 20 from being engaged by the lower portion of the frame of the plate holder when the latter is withdrawn from the holder I provide means whereby the flap is automatically retracted from the opening in the plate holder frame at a proper point in the relative movement of the members. To this end, the controlling lever 22 is provided with a cam or shoe 29 which normally projects within the plate holder frame 10 in advance of the flap (Figs. 2 and 4) and is engaged by the lower portion of the frame as an abutment when the latter is withdrawn (Fig. 5). This engagement operates as shown to automatically draw the flap 20 from within the frame just as the said flap reaches the lower edge of the shutter 16 and to a position in which it is cleared by the projecting edge of the holder.

It will be observed that a camera back constructed in accordance with my invention can be adapted to styles of plate holders now in general use and thus obviate the necessity of supplying a special type of holders in order to take advantage of my improvements. Furthermore by providing the light excluding device upon the camera back, the devices usually provided upon each plate holder to perform this function may, in some instances, be dispensed with and instead of supplying such a large number of necessarily cheap devices (several holders being ordinarily used with the same camera) a single device fitted to the camera back can coöperate with each holder as it is used and the device itself constructed with more care to give great efficiency.

I claim as my invention.

1. The combination with a camera back with which a plate holder is adapted to coöperate, of a yielding light excluding member carried thereby to extend outwardly beyond the coöperating face thereof and into engagement with the shutter slide of a plate holder applied to the back.

2. The combination with a camera back with which a plate holder is adapted to coöperate, of a yielding light excluding member carried thereby to project outwardly beyond the coöperating face thereof and within the frame of a plate holder applied to the back and to extend across the shutter slide of the plate holder.

3. The combination with a camera back comprising an open frame with which a plate holder is adapted to coöperate, of a yielding light excluding member arranged within the opening in the frame to extend outwardly beyond the coöperating face thereof and within the frame of a plate holder applied to the back.

4. The combination with a camera back, of a removable plate holder supported thereon and provided with a shutter and a light excluding member carried by the back and coöperating with the shutter.

5. The combination with a camera back, of a removable plate holder supported thereon and having an opening therein, a movable shutter adapted to pass through said opening, and a light excluding member carried by the back and automatically closing the opening in the plate holder when the shutter is withdrawn therefrom.

6. The combination with a camera back, of a removable plate holder supported thereon and having an opening therein, a movable shutter adapted to pass through said opening and a light excluding member carried by the camera back and engaging the shutter, said light excluding member being adapted to automatically close the opening in the holder when the shutter is withdrawn therefrom.

7. The combination with a camera back, of a removable plate holder supported thereon and provided with an opening, a removable shutter adapted to pass through said opening and light excluding devices carried by the plate holder and back, each respectively and controlling the opening in the plate holder said devices being displaced successively by the introduction of the shutter within the opening.

8. The combination with a camera back comprising a frame having an opening therein, of a plate holder coöperating with the frame and provided with a shutter movable relatively thereto, and a swinging light excluding flap arranged within the opening in the camera back and engaging the shutter.

9. The combination with a camera back having an opening therein, of a plate holder comprising a frame arranged to surround the opening in the back and having an opening therein, a shutter movable through the opening in the frame and a swinging light excluding flap arranged within the opening in the back and adapted to engage the shutter or to close the opening in the frame when the shutter is withdrawn therefrom.

10. The combination with a camera back comprising two opposed members forming a plate holder chamber between them, said chamber being accessible for the introduction of the plate holder through an opening at one end thereof, of a movable light excluding member for automatically closing the opening to the chamber when a plate holder is withdrawn therefrom, said light excluding member being displaced from the opening upon the introduction of the plate holder into the chamber.

11. The combination with a camera back with which a plate holder is adapted to coöperate, of a yielding light excluding member carried thereby to project outward beyond the face thereof, and beyond the face of a plate holder applied to the back to coöperate with the shutter slide within the frame of the plate holder, said light excluding member being provided with a controlling shoe also adapted to project within the frame of the plate holder.

12. The combination with a camera back, of a pivoted light excluding flap extending rearwardly therefrom and adapted to coöperate with a plate holder, said flap having a controlling member or shoe extending forward of the free edge of the flap and adapted to be engaged by the holder to lift the flap when the holder is withdrawn.

13. The combination with a camera back, of a pivoted light excluding flap extending rearwardly therefrom and adapted to coöperate with a plate holder, said flap having a controlling member or shoe connected thereto extending forwardly of the free edge of the flap and pivoted to the back, said controlling member being adapted to be engaged by the holder at a point beyond its pivot to lift the flap when the holder is withdrawn.

14. The combination with a camera back provided with means for supporting a plate holder, of a plate holder removably supported by said means, a movable shutter carried by the plate holder, a movable light excluding member carried by the back and normally engaging the shutter and means for releasing the light excluding member from such engagement at a predetermined point in the relative movement of the back and plate holder when the latter is withdrawn from its supporting means.

15. The combination with a camera back provided with means for supporting a plate holder, of a plate holder removably supported thereby and comprising a frame, a shutter movable in the frame, a movable light excluding member carried by the back and normally projecting within the frame and into engagement with the shutter and means for automatically retracting said light excluding member from within the frame when the plate holder is withdrawn from its supporting means.

16. The combination with a camera back, of a plate holder removably supported thereon and provided with an abutment, a removable shutter carried by the plate holder, a movable light excluding member carried by the back and normally engaging the shutter and a controlling member for the light excluding member tripped by the abutment on the holder when the latter is withdrawn to retract the light excluding member from engagement with the shutter.

17. The combination with a camera back, of a plate holder removably supported thereon and comprising a frame, a shutter movable in the frame, a movable light excluding member carried by the back and normally projecting within the frame and into engagement with the shutter and a controlling member for the light excluding member tripped by the engagement of a portion of the frame to retract the light excluding member therefrom when the holder is withdrawn from the camera back.

18. The combination with a camera back having an opening therein, of a plate holder supported thereby and comprising a frame, a shutter movable in the frame, a movable light excluding member carried by the back and normally projecting within the frame and into engagement with the shutter and a controlling member for said light excluding member comprising a lever pivoted within the opening in the back and connected to the light excluding member, said lever having a portion projecting within the frame and engaged by a portion of the latter to retract the light excluding member from within the frame when the plate holder is withdrawn from the back.

19. The combination with a camera back having an opening therein, of a plate holder supported thereby and comprising a frame, a shutter movable in the frame, a light excluding member pivoted within the opening in the back and normally projecting within the frame and into engagement with the shutter and means for automatically retracting the light excluding member from within the frame when the holder is withdrawn from its supporting means.

20. The combination with a camera back having an opening therein, of a plate holder supported upon said back and comprising a frame, a shutter movable in the frame, a light excluding member pivoted within the opening in the back and normally projecting within the frame and into engagement with the shutter, a lever pivoted within the opening in the back and connected for simultaneous movement with the light excluding member, said lever being provided with a portion projecting within the frame and tripped by engagement with the latter to retract the light excluding member from within the frame when the plate holder is withdrawn.

21. The combination with a camera back having an opening therein, of a light excluding member pivoted within the opening in the back and normally projecting outwardly beyond the frame, said member being provided with a projection, a case plate secured to the back adjacent the opening therein and provided with a slot, a lever pivoted to the case plate and having a slot therein with which the projection on the light excluding member coöperates, said lever also being provided with a projection extending within the slot in the case plate and a cam projecting within the frame in rear of the light excluding member and a spring arranged beneath the case plate and engaging the projection on the lever to operate the light excluding member.

TRUMAN W. INGERSOLL.

Witnesses:
FREDERICK G. INGERSOLL,
GUSTAVUS LORVINGER.